Figure 1:
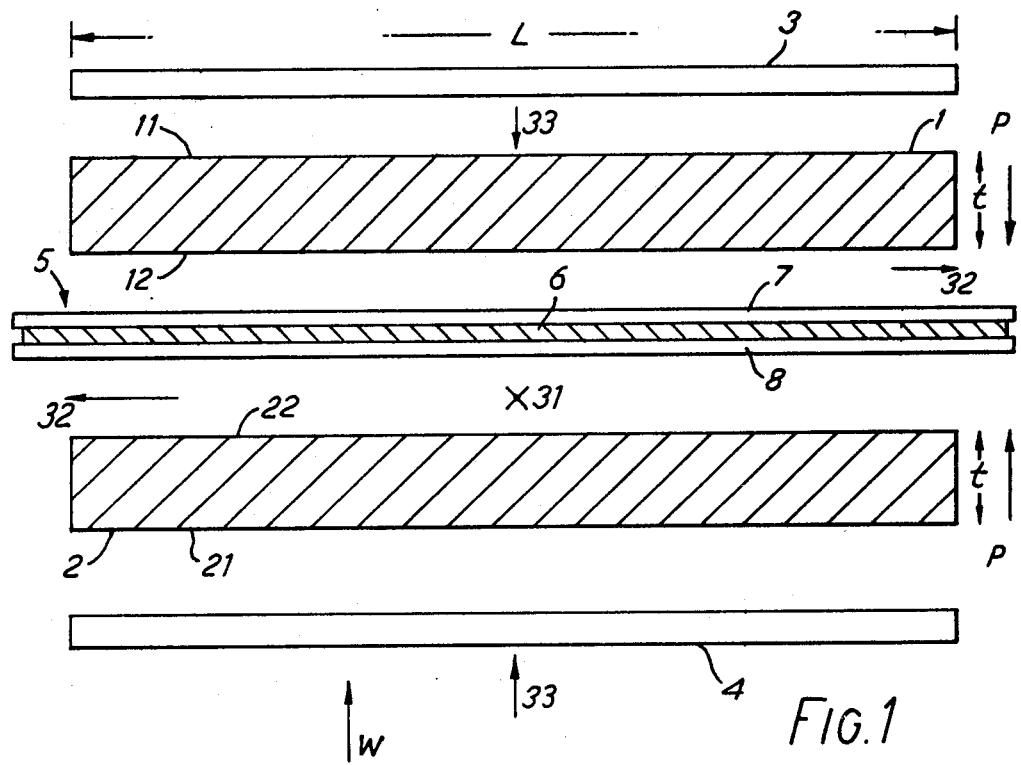

United States Patent [19]
Holt

[11] Patent Number: 4,461,179
[45] Date of Patent: Jul. 24, 1984

[54] DEVICE SENSITIVE TO PRESSURE WAVES

[75] Inventor: Lyn Holt, Maidenhead, England

[73] Assignee: EMI Limited, Hayes, United Kingdom

[21] Appl. No.: 346,200

[22] Filed: Feb. 5, 1982

[30] Foreign Application Priority Data

Feb. 6, 1981 [GB] United Kingdom ............... 81 03464

[51] Int. Cl.³ .......................................... H01L 41/18
[52] U.S. Cl. ..................... 73/658; 310/800
[58] Field of Search ................. 73/658, 632; 310/800; 367/180, 181; 428/422, 461

[56] References Cited

U.S. PATENT DOCUMENTS

| 3,798,474 | 3/1974 | Cassand et al. | 310/800 |
| 3,947,644 | 3/1976 | Uchikawa | 310/800 |
| 4,041,446 | 8/1977 | Liebermann | 367/181 |
| 4,166,229 | 8/1979 | DeReggi et al. | 310/800 |
| 4,204,135 | 5/1980 | Murayama | 310/800 |

FOREIGN PATENT DOCUMENTS 494323 6/1978 Australia .
2811783 9/1979 Fed. Rep. of Germany .
2282627 3/1976 France .

OTHER PUBLICATIONS

P. E. Bloomfield et al., "Piezo and Pyroelectricity in Poly(Vinylidene Fluoride)", *Nav. Res. Rev.*, vol. 31, No. 5, pp. 1–15, May 1978.

"Piezoelectric Polymer Flexural Disk Hydrophone"-T. D. Sullivan and J. M. Powers-*J of the Acoustic Soc of America*-pp. 1396–1401.

*Primary Examiner*—Stephen A. Kreitman
*Attorney, Agent, or Firm*—Fleit, Jacobson, Cohn & Price

[57] ABSTRACT

A device sensitive to pressure waves including first and second sheets of polyvinylidene fluoride supported in spaced apart relationship. The major faces of each sheet are provided with respective inner and outer foils of copper and an electrically insulating sheet of PTFE is sandwiched between, and bonded to, the inner foils. The first and second sheets are poled in a direction normal to their respective major surfaces so as to be more sensitive to pressures waves incident thereon, along said normal direction, than to pressure waves incident thereon along other directions. The inner electrically conductive sheets are electrically connected together and a voltage sensor is used to detect voltages, developed across the major surfaces of the first and second sheets and indicative of pressure waves incident thereon.

7 Claims, 2 Drawing Figures

DEVICE SENSITIVE TO PRESSURE WAVES

The present invention relates to a device sensitive to pressure waves. The device uses a vinylidene fluoride polymer (PVdF), and it has especial application to circumstances in which it is desired that the device be more sensitive to pressure waves, such as sound waves, incident thereon in one direction than to pressure waves incident thereon in other directions, particularly directions perpendicular to said one direction.

According to the invention, there is provided a device sensitive to pressure waves, characterised by first and second planar sheets of polyvinylidene fluoride supported in spaced apart relationship, each sheet being poled along a direction normal to the major faces of the sheets so as to be more sensitive to pressure waves incident thereon, along said normal direction, than to pressure waves incident thereon along other directions, and by respective faces of the sheets being electrically connected to allow differences of voltage developed across the faces of each sheet to be sensed when pressure waves are incident thereon.

Figure 2:
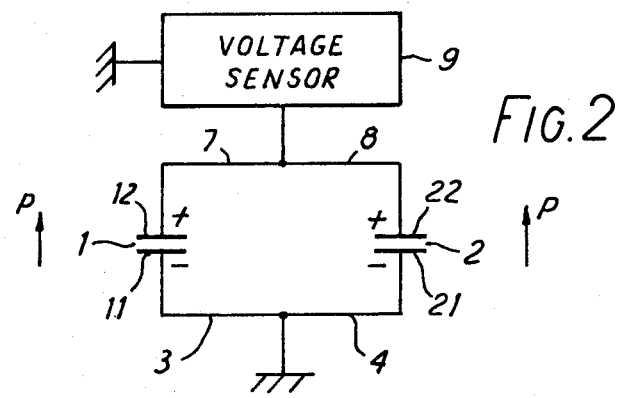

For a better understanding of the invention, reference will now be made by way of example to the accompanying drawing in which:

FIG. 1 is an exploded plan view of a pressure sensitive device in accordance with the invention, and FIG. 2 is an equivalent circuit of the device in association with a voltage sensor.

In FIG. 2, items equivalent to items of FIG. 1 have the same references as in FIG. 1.

The device comprises two identical sheets 1 and 2 of polyvinylidene fluoride (PVdF). Each sheet has a thickness t in the range 100 $\mu$m to 2000 $\mu$m e.g. 500 $\mu$m, (the sensitivity below 100 $\mu$m being too low to be of use), a length L of e.g. 15 cm and a width (i.e. perpendicular to the plane of the drawing) of 1.5 cm, for example.

The major faces 11, 12, and 21, 22 of the sheets 1, 2 are coated with electroless copper or any other suitable electrically conductive coatings. Identical outer conductive sheets of copper foil 3, 4 having a thickness of e.g. 35 $\mu$m are fixed to the outer faces 11, and 21 of the PVdF sheets 1, 2 with neoprene adhesive sufficiently thin to provide a good conductive connection from the copper foil to the electroless copper.

An inner electrode member 5 sandwiched between the sheets 1 and 2 of PVdF comprises a sheet 6 of polytetrafluoroethylene (PTFE), sandwiched between identical sheets of copper 7 and 8. The sheets may be of different thicknesses, respectively 35 $\mu$m thick and 17 $\mu$m thick, for example.

The sheets of PVdF 1 and 2 are fixed to the copper sheets 7 and 8 by neoprene adhesive sufficiently thin to provide good conductive connection from the copper sheets 7 and 8 to the electroless copper coatings on faces 12 and 22 of the PVdF sheets.

The sheets of PVdF have anisotropic piezoelectric, properties. Three directions (termed 33, 32 and 31) may be defined. The 33 direction in the shown example of FIG. 1 is normal, to and facing, the major face 21 or 11 of sheet 2 or 1. The 32 direction lies in the plane of sheet 2 or 1 parallel to the length of the sheet. The 31 direction lies in the plane of the sheet perpendicular to the length (i.e. perpendicular to the plane of the drawing). It will be appreciated that both the 31 and 32 directions are perpendicular to the 33 direction.

The sheets are polarised in known manner so that the material is much more sensitive to pressure in the 33 direction than in the 31 direction and is much more sensitive to pressure in the 31 direction than in the 32 direction. Thus the principal polarisation is in the direction P as indicated by arrows in FIG. 1, so that both sheets are poled in the same sense relative to the inner member 5.

The sheets of PVdF may be regarded for the purposes of constructing an equivalent electrical circuit as capacitors, although it should be borne in mind that they are not, in fact, capacitors.

The device of FIG. 1 is intended to be connected to a high impedance voltage sensor 9 (e.g. a chart recorder), the circuit being as shown in FIG. 2, the sheets 1 and 2 being connected with their capacitances in parallel and poled in the same sense relative to the inner member 5 as indicated by arrows P so that the negative sides 11, 21 are connected to the outer conductive sheets 3 and 4 which are grounded.

The circuit is completed by commonly connecting the inner copper sheets 7 and 8 to the voltage sensor 9, which senses the voltage between sheets 7 and 8 and ground.

The PTFE sheet 6 between the copper sheets 7 and 8, of the inner member 5, ensures that the device is sufficiently stiff or rigid. Said PTFE sheet may, with advantage, be replaced by a sheet of polyester material.

Any flexure of the sheets 1 or 2 will cause (say) sheet 1 to be in tension and sheet 2 to be in compression. This results in the charges on the capacitances 1 and 2 of FIG. 2 varying oppositely, so ensuring that the device exhibits a negligible response to such flexure.

Because of the relatively low response of the sheets to stress in the 32 and 31 directions, the sensitivity of the device is relatively low in those directions compared with that in the 33 direction.

A pressure wave propagating in the direction of arrow W in FIG. 1 will change the charge of both capacitances 1 and 2 in the same sense, and will thus accumulate, rather than cancel, the net charge developed across the device.

Various modifications to the described example may be made. For instance each sheet of PVdF 1 or 2 may be replaced by a stack of 2 or more sheets. The PTFE sheet 6 may be replaced by any other suitable plastics sheet. Copper where used may be replaced by any other suitable conductor.

What I claim is:

1. A device sensitive to pressure waves comprising first and second planar sheets of polyvinylidene flouride supported in spaced apart relationship, each sheet being poled along a direction normal to the major faces of the sheets so as to be more sensitive to pressure waves incident thereon along said normal direction than to pressure waves incident thereon along other directions;

electrical connections being made to the respective faces of the sheets and associated electrical circuitry being provided to cancel substantially differences of voltage developed across the said major faces as a result of flexure of the sheets and to allow differences of voltages, otherwise developed across said major faces, as a result of pressure waves incident on the sheets along said normal direction, to be detected.

2. A device according to claim 1 wherein the faces of each said sheet are provided with respective inner and outer electrically conductive sheets in electrically conductive contact with the faces, and the said first and second sheets are poled, in said normal direction, in the same sense relative to the said inner electrically conductive sheets which are electrically connected.

3. A device according to claim 2 wherein a sheet of an electrically insulating material (e.g. PTFE) sandwiched between, and bonded to, said electrically conductive inner sheets.

4. A device according to claims 1, 2 or 3 wherein the said sheets of polyvinylidene fluoride have a thickness lying in the range 100 μm to 2000 μm.

5. A device according to any one of claims 3 wherein the said electrically conductive sheets are of copper and wherein the said major faces of the first and second sheets have coatings of electroless copper.

6. A device according to claim 3 wherein said electrically conductive inner sheets have different thicknesses.

7. A device according to claim 2 or claim 3 including voltage sensing means for sensing differences of voltage developed across the faces of each sheet when pressure waves are incident thereon.

* * * * *